(12) United States Patent
Rigge

(10) Patent No.: US 8,214,416 B2
(45) Date of Patent: Jul. 3, 2012

(54) FLOATING-POINT ADDITION ACCELERATION

(75) Inventor: Lawrence A. Rigge, Emmaus, PA (US)

(73) Assignee: Agere Systems Inc., Allentown, PA (US)

(*) Notice: Subject to any disclaimer, the term of this patent is extended or adjusted under 35 U.S.C. 154(b) by 1009 days.

(21) Appl. No.: 12/180,759

(22) Filed: Jul. 28, 2008

(65) Prior Publication Data
US 2010/0023574 A1    Jan. 28, 2010

(51) Int. Cl.
G06F 7/42    (2006.01)
(52) U.S. Cl. ...................................................... 708/505
(58) Field of Classification Search .................. 708/498, 708/505
See application file for complete search history.

(56) References Cited

U.S. PATENT DOCUMENTS

| | | | |
|---|---|---|---|
| 4,758,974 A | | 7/1988 | Fields et al. |
| 5,010,508 A | * | 4/1991 | Sit et al. .......................... 708/505 |
| 5,373,461 A | * | 12/1994 | Bearden et al. ............... 708/505 |
| 5,684,729 A | * | 11/1997 | Yamada et al. ............... 708/505 |
| 5,923,575 A | * | 7/1999 | Efrat et al. .................... 708/205 |
| 6,094,668 A | * | 7/2000 | Oberman ........................ 708/505 |

* cited by examiner

*Primary Examiner* — Chuong D Ngo
(74) *Attorney, Agent, or Firm* — Mendelsohn, Drucker & Associates, P.C.; David L. Cargille; Steve Mendelsohn

(57) ABSTRACT

Embodiments of the present invention generate a normalized floating-point sum from at least two floating-point addends. The mantissa of an un-normalized floating-point sum is generated. A pointer is generated which indicates the location of the left-most significant digit (LSD) in the mantissa of the un-normalized floating-point sum. A plurality of possible values for the exponent of the normalized floating-point sum are generated, in parallel with each other and in parallel with the mantissa addition, based on a common exponent value (e.g., the largest of the two addends' exponent values). Based on the LSD pointer, one of the possible values is selected as the exponent of the normalized floating-point sum. The mantissa of the un-normalized floating-point sum is normalized to yield the mantissa of the normalized floating-point sum. By generating the possible exponent values in parallel, embodiments of the present invention can result in significant time savings over prior-art methods.

22 Claims, 7 Drawing Sheets

FIG. 3
(Prior Art)

| TABLE 1 | | |
|---|---|---|
| Location of "1" in LSD Pointer | Decimal Value | Binary (2's Complement) |
| 0 | -23 | 101001 |
| 1 | -22 | 101010 |
| 2 | -21 | 101011 |
| 3 | -20 | 101100 |
| 4 | -19 | 101101 |
| 5 | -18 | 101110 |
| 6 | -17 | 101111 |
| 7 | -16 | 110000 |
| 8 | -15 | 110001 |
| 9 | -14 | 110010 |
| 10 | -13 | 110011 |
| 11 | -12 | 110100 |
| 12 | -11 | 110101 |
| 13 | -10 | 110110 |
| 14 | -9 | 110111 |
| 15 | -8 | 111000 |
| 16 | -7 | 111001 |
| 17 | -6 | 111010 |
| 18 | -5 | 111011 |
| 19 | -4 | 111100 |
| 20 | -3 | 111101 |
| 21 | -2 | 111110 |
| 22 | -1 | 111111 |
| 23 | 0 | 000000 |
| 24 | 1 | 000001 |

FLOATING-POINT ADDITION ACCELERATION

BACKGROUND OF THE INVENTION

1. Field of the Invention

The present invention relates to electronics, and in particular, to the performance of mathematical operations by electronic circuits.

2. Description of the Related Art

Floating-point representation of a number in scientific notation is well known in the art, as are the IEEE 754 floating-point format and floating-point data structures. U.S. Pat. No. 4,758,974, the teachings of which are hereby incorporated by reference in their entirety, describes a set of related methods for reducing the time required for the addition of floating-point addends.

SUMMARY OF THE INVENTION

In one embodiment, the invention is a machine-implemented method for generating a normalized floating-point sum from at least first and second floating-point addends, where the floating point sum comprises a mantissa and an exponent. The mantissa of the normalized floating-point sum is generated based on the first and second floating-point addends. Independent of mantissa generation, a plurality of possible values for the exponent of the normalized floating-point sum is generated based on a common exponent value. One of the possible values is then selected to generate the exponent of the normalized floating-point sum.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 3 includes Table 1 which presents all the possible values of an LSD pointer in a system with a 24-bit mantissa, and the corresponding shift values in decimal and binary.

DETAILED DESCRIPTION

Floating-Point Number Format

Floating-point representation of a number is scientific notation, i.e., $s \times i.f \times b^n$, where s is the sign digit (+1 or −1), i is the leading digit, f is the fraction, b is the base, and n is the exponent. The term if is the significand, or mantissa, and is typically represented by m.

IEEE 754, a widely-used floating-point format, assumes a base b of 2 and an implied leading digit i of 1, yielding $s \times 1.f \times 2^n$. Thus, IEEE 754 data structures need only encode sign digit s, fraction f, and exponent n. IEEE 754 posits two types of floating-point formats: single-precision 32-bit format and double-precision 64-bit format. All examples which follow assume single-precision 32-bit format.

Figure 1:
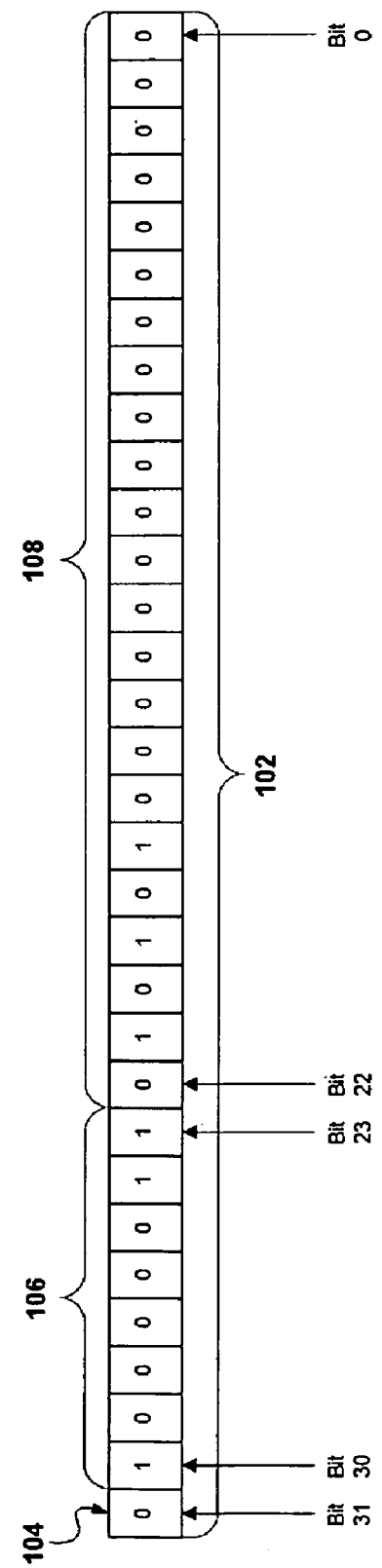
FIG. 1 is a graphical depiction of a prior-art IEEE 754 single-precision 32-bit number 102.

FIG. 1 is a graphical depiction of a prior-art IEEE 754 single-precision 32-bit data structure 102. Data structure 102 is terminated on the right with bit 0 and terminated on the left with bit 31. Data structure 102 comprises three fields: 1-bit sign digit field 104, 8-bit exponent field 106, and 23-bit fraction field 108.

Sign digit field 104 (bit 31) represents sign digit s. Sign digit field 104 can be either a 0 or a 1, where 0 indicates +1 and 1 indicates −1. For the example shown in FIG. 1, sign digit field 104 is 0, which means s=+1.

Exponent field 106 represents exponent n. Starting with least-significant bit (LSB) 23 and ending with most-significant bit (MSB) 30, exponent field 106 comprises 8 bits, and as such can store 8-bit binary numbers from 0 through 255 decimal. However, a floating-point format typically needs to represent both negative and positive exponents n. IEEE 754 represents both negative and positive exponents by using a bias, i.e., a number added to n which yields the value which will be stored. IEEE 754 single-precision 32-bit format uses a bias value of 127. Thus, an exponent n of −27 decimal will be stored in exponent field 106 as (−27+127) or 100 decimal (i.e., 01100100 binary), and an exponent n of 88 will be stored as (88+127) or 215 decimal (i.e., 11010111 binary). The binary values 00000000 and 11111111 are reserved for exceptions (discussed below). As such, the effective range of exponent n is −126 to +127. In FIG. 1, exponent field 106 is 10000011 binary, or 130 decimal. Subtracting a bias of 127 from 130 yields an exponent n of 3.

Fraction field 108 represents fractions. Fraction field 108 comprises 23 bits, starting with LSB 0 and ending with MSB 22. The 23 bits of fraction field 108, together with an implied leading 1 (except when exponent field 106 is all zeroes), yield a 24-bit mantissa. In FIG. 1, fraction field 108 is 01010100000000000000000, i.e., binary mantissa 1.010101, i.e., 1.328125 decimal.

Thus, floating-point data structure 102 represents $+1 \times 1.328125 \times 2^3$, or 10.625 decimal.

Addition of Floating-Point Numbers

It is desirable that floating-point numbers be normalized, i.e., that there be only one significant digit (which in binary can only be 1) to the left of the radix point of mantissa m. Thus, the addition of two floating-point numbers typically involves two normalized floating-point addends A and B, and yields a normalized sum S. The mantissas of these three numbers are designated $M_A$, $M_B$, and $M_S$, respectively, and the exponents are designated $E_A$, $E_B$, and $E_S$. In alternative floating-point formats to IEEE 754, mantissas $M_A$ and $M_B$ can be represented in 2's complement format, thus allowing a single simple structure to perform addition or subtraction.

The general process for summing addends A and B consists of three steps: de-normalization of the addends, mantissa addition, and normalization of the sum.

In de-normalization of the addends, if exponents $E_A$ and $E_B$ are not equal, then one or more of the addends is de-normalized until $E_A$ and $E_B$ match. A typical method for de-normalizing addends is to increase the smallest exponent $E_{smallest}$ by x to equal the largest exponent $E_{largest}$ and shift the binary point of mantissa $M_{smallest}$ of the addend with the smallest exponent x places to the left to yield de-normalized mantissa $M_{smallest,d}$. For example, to add $1.0 \times 2^2$ (addend A) and $1.11111 \times 2^7$ (addend B), the method described above would increase $E_{smallest}$ (in this case, $E_A$, or 2) by 5 so that $E_{smallest}$ equals $E_{largest}$ (in this case, $E_B$, or 7). Then the binary point of $M_{smallest}$ (in this case, $M_A$, or 1.0) is shifted an equal number of places to the left (i.e., 5) to yield de-normalized mantissa $M_{smallest,d}$ 0.00001.

When exponents $E_A$ and $E_B$ are equal, then one of the exponents is arbitrarily selected as $E_{largest}$.

In mantissa addition, $M_{smallest,d}$ and the mantissa $M_{largest}$ associated with the largest exponent are added to yield a possibly un-normalized mantissa sum $M_{S,u}$. If both addends are positive, or if both addends are negative, then the left-most significant digit (LSD) of $M_{S,u}$ will be either one or two places to the left of the binary point. If one addend is positive and the other is negative, then the LSD of $M_{S,u}$ can occur anywhere from one place to the left of the binary point to 23 places to the right. In the example above, $M_{largest}$ 1.11111 and $M_{smallest,d}$ 0.00001 are added to yield $M_{S,u}$ 10.00000.

In normalization of the sum, if $M_{S,u}$ is not already in normalized form, then it is normalized to yield normalized sum S. In other words, if required, the binary point of $M_{S,u}$ is shifted left or right as appropriate until there is only one significant digit to the left of the binary point to yield normalized mantissa sum $M_S$. Then, $E_{largest}$ is adjusted by y to yield the exponent $E_S$ of normalized sum S. In the example above, $M_{S,u}$ 10.0 is normalized by shifting the binary point one place to the left to yield $M_S$ 1.0. Then, $E_{largest}$ 7 is increased by 1 to yield $E_S$ of 8.

Exceptions: Overflow, Underflow, and Zero

An exception occurs when a floating-point operation yields a result which cannot be represented in the floating-point numbering system used. Three common exceptions are overflow, underflow, and zero. Overflow and underflow exceptions occur when addition results in a sum, the absolute value of which is either too large (overflow) or too small (underflow) to be represented in the floating-point numbering system used. For example, IEEE 754 32-bit single-precision format is not capable of representing a positive number greater than $(2-2^{-23}) \times 2^{127}$ (positive overflow) or less than $2^{-126}$ (positive underflow), or a negative number the absolute value of which is greater than $(2-2^{-23}) \times 2^{127}$ (negative overflow), or less than $2^{-126}$ (negative underflow). Furthermore, IEEE 754, with its implied leading digit of 1, is incapable of naturally representing 0 (zero exception).

When a system encounters an exception, it typically generates a corresponding exception signal. In a typical system, that exception signal is then trapped and processed in a manner determined by the system administrator. In a system using IEEE floating-point format, the typical manner for processing exceptions is to use special, reserved combinations of exponents and fractions for specific exceptions, and to use the sign digit of the intermediate result.

Specifically, an overflow exception is typically represented by a fraction of all 0s and an exponent of all 1s (also known as infinity), and the sign digit of the intermediate result. Thus, positive overflow is represented by positive infinity, and negative overflow is represented by negative infinity. A negative underflow exception is typically represented by either negative zero (i.e., fraction is 0, exponent is 0, and sign digit is 1) or the smallest negative number that can be represented (i.e., $-2^{-126}$). A positive underflow exception is typically represented by either positive zero (i.e., fraction is 0, exponent is 0, and sign digit is 0) or the smallest positive number that can be represented (i.e., $2^{-126}$). Lastly, a zero exception is typically represented by a fraction of all 0s, an exponent of all 0s, and a sign digit of 0. Note that the implied leading digit of 1 is not used in this case.

Find Left-Most Significant Digit (FLSD)

U.S. Pat. No. 4,758,974 describes a set of related methods for reducing the time required for the addition of floating-point addends. The key to this time reduction is to calculate in parallel both the un-normalized mantissa sum $M_{S,u}$ and the location of the left-most significant digit (LSD) within $M_{S,u}$. Thus, the subsequent normalization adjustments of $M_{S,u}$ and $E_{largest}$ can take place in parallel rather than in serial.

The methods described in U.S. Pat. No. 4,758,974 are referred to as Find Left-most Significant Digit, or FLSD. One of those methods is a two-step method, wherein a first step finds an approximate location of the LSD, and a second step finds the exact location. Another method finds the exact location of the LSD in one step (the one-step FLSD method).

Figure 2:
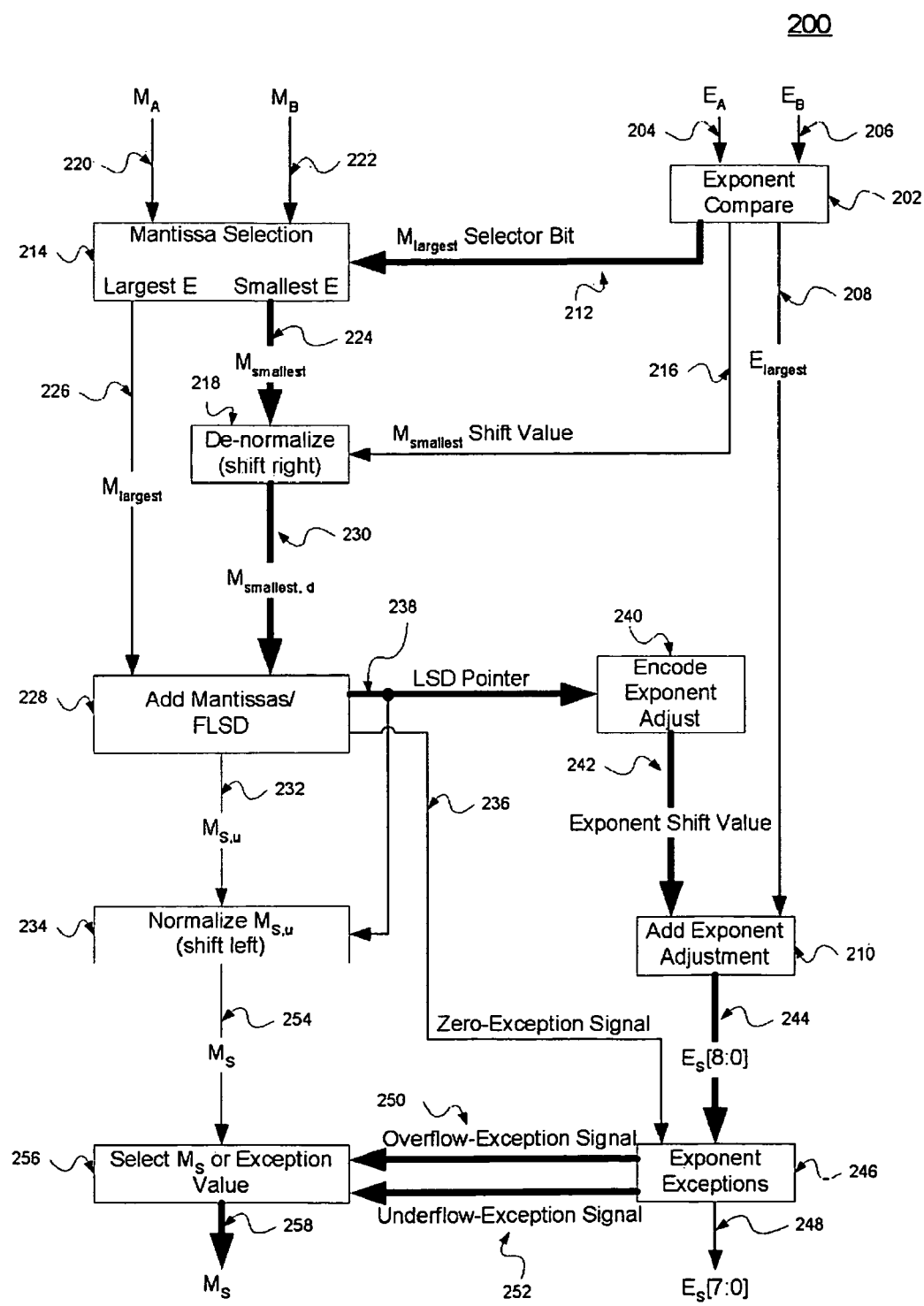
FIG. 2 is a block diagram of circuitry 200 designed to implement a prior-art one-step FLSD method.

FIG. 2 is a block diagram of circuitry 200 designed to implement a prior-art one-step FLSD method. In FIG. 2, bolded arrows indicate the critical timing path.

Exponent Compare module 202 receives exponents $E_A$ (204) and $E_B$ (206), determines which is the greatest ($E_{largest}$), and outputs three values. $E_{largest}$ (208) is sent to Add Exponent Adjustment module 210. $M_{largest}$ Selector Bit (212), which indicates which of $M_A$ and $M_B$ is associated with $E_{largest}$, is sent to Mantissa Selection module 214. $M_{smallest}$ Shift Value (216), which represents the difference between exponents $E_A$ and $E_B$, is sent to De-Normalize module 218.

Mantissa Selection module 214 receives mantissas $M_A$ (220) and $M_B$ (222), and also receives the $M_{largest}$ Selector Bit (212) from Exponent Compare module 202. The $M_{largest}$ Selector Bit (212) tells Mantissa Selection module 214 which of $M_A$ (220) and $M_B$ (222) is associated with $E_{largest}$. Mantissa Selection module 214 sends the mantissa $M_{smallest}$ (224) of the addend with the smallest exponent to De-Normalize $M_{smallest}$ module 218, and sends the mantissa $M_{largest}$ (226) of the addend with the largest exponent to Add Mantissas/FLSD module 228.

De-normalize $M_{smallest}$ module 218 de-normalizes $M_{smallest}$ (224), i.e., shifts the binary point of $M_{smallest}$ (224) to the left by the number of places indicated by the M smallest Shift Value (216) received from Exponent Compare module 202. Module 218 then sends the de-normalized result, $M_{smallest,d}$ (230), to Add Mantissas/FLSD module 228.

Add Mantissas/FLSD module 228 adds $M_{largest}$ (226) and $M_{smallest,d}$ (230), and sends resulting un-normalized mantissa sum $M_{S,u}$ (232) to Normalize $M_{S,u}$ module 234. If $M_{S,u}$ (232) is 0, then Zero-Exception Signal (236) is set to 1; otherwise, to 0.

At the same time as mantissa addition, module 228 also finds the location of the left-most significant digit (LSD) of $M_{S,u}$ (232) and encodes that location as a 25-bit LSD Pointer (238). Specifically, 24 of the 25 bits of the LSD Pointer (238) will be 0, and the location of a single bit of value 1 within the pointer will indicate the location of the LSD within $M_{S,u}$ (232). Module 228 sends the LSD Pointer (238) to Encode Exponent Adjust module 240 and to Normalize $M_{S,u}$ module 234.

Encode Exponent Adjust module 240 encodes the LSD Pointer (238) into a 2's complement binary Exponent Shift Value (242) to be added to $E_{largest}$ (208) to yield the exponent $E_s$ of the normalized sum (244). FIG. 3 includes Table 1 which presents all the possible values of an LSD pointer in a system with a 24-bit mantissa, and the corresponding shift values in decimal and binary. Encode Exponent Adjust module 240 then sends the Exponent Shift Value (242) to Add Exponent Adjustment module 210.

Add Exponent Adjustment module 210 adds the Exponent Shift Value (242) to $E_{largest}$ (208) to yield a 9-bit exponent $E_s$ (244), and sends $E_s$ (244) to Exponent Exceptions module 246. $E_s$ (244) is a 9-bit number because exponent adjustment may result in an overflow/underflow exception and the 9th bit can be used for detection of overflow and underflow.

Exponent Exceptions module 246 receives 9-bit exponent $E_s$ (244) from module 210 and the Zero-Exception Signal (236) from Add Mantissas/FLSD module 228, determines whether an exception has occurred, and outputs 1) the appropriate $E_s$ value (248), 2) the appropriate Overflow-Exception Signal (250), and 3) the appropriate Underflow-Exception Signal (252).

Figure 4:
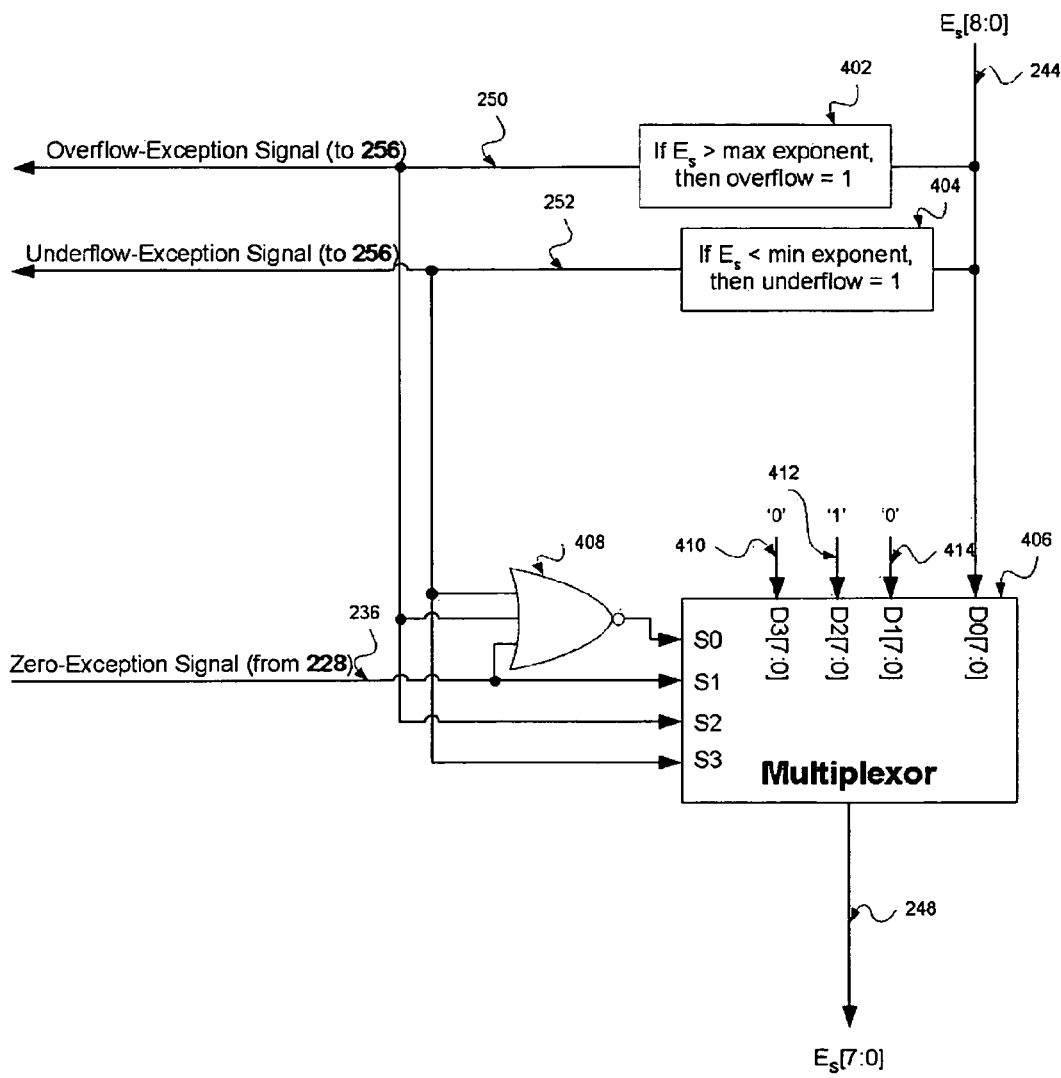
FIG. 4 is a block diagram of prior-art Exponent Exceptions module 246 of FIG. 2.

FIG. 4 is a block diagram of prior-art Exponent Exceptions module 246 of FIG. 2. Received 9-bit exponent $E_s$ (244 of FIG. 2) is sent to logic blocks 402 and 404, and to data input D0 of multiplexor 406. If an overflow exception has occurred, then logic block 402 sets Overflow-Exception Signal (250 of FIG. 2) to 1; otherwise, module 402 sets Overflow-Exception Signal (250 of FIG. 2) to 0. Overflow-Exception Signal (250 of FIG. 2) goes to 1) Select $M_s$ or Exception Value module 256 of FIG. 2, 2) NOR gate 408, and 3) select input S2 on multiplexor 406.

Similarly, if an underflow exception has occurred, then logic block 404 sets the Underflow-Exception Signal (252 of FIG. 2) to 1; otherwise, module 404 sets the Underflow-Exception Signal (252 of FIG. 2) to 0. The Underflow-Exception Signal (252 of FIG. 2) goes to 1) Select $M_s$ or Exception Value module 256 of FIG. 2, 2) NOR gate 408, and 3) select input S3 on multiplexor 406.

Module 246 also receives the Zero-Exception Signal (236) from module 228 of FIG. 2, which is sent to 1) NOR gate 408 and 2) select input S1 on multiplexor 406.

NOR gate 408 receives three inputs: Overflow-Exception Signal (250 of FIG. 2), Underflow-Exception Signal (252 of FIG. 2), and Zero-Exception Signal (228 of FIG. 2). If all three of these inputs are 0 (i.e., there are no exceptions), then NOR gate 408 will output a 1 to select input S0 on multiplexor 406; otherwise, it will output a 0.

Multiplexor 406 receives four data inputs (D0, D1, D2, D3) and four select inputs (S0, S1, S2, S3). If the Underflow-Exception Signal (252 of FIG. 2) on select input S3 is 1, then multiplexor 406 will output the 8-bit Underflow-Exception Exponent Value (410) on data input D3, e.g., an $E_s$ (248 of FIG. 2) consisting of all zeroes. If the Overflow-Exception Signal (250 of FIG. 2) on select input S2 is 1, then multiplexor 406 will output the 8-bit Overflow-Exception Exponent Value (412) on data input D2, e.g., an $E_s$ (248) consisting of all ones. If the Zero-Exception Signal (236 of FIG. 2) on select input S1 is 1, then multiplexor 406 will output the 8-bit Zero-Exception Exponent Value (414) on data input D1, e.g., an $E_s$ (248 of FIG. 2) consisting of all zeroes. Otherwise, if none of the three exception signals is 1, then NOR gate 406 will output a 1 to select input S0, causing multiplexor 406 to output the first eight bits of the $E_s$ (244 of FIG. 2) received from Add Exponent Adjustment module 210 of FIG. 2 (data input D0).

Returning to FIG. 2, Normalize $M_{S,u}$ module 234 normalizes un-normalized mantissa sum $M_{s,u}$ (232), i.e., if $M_{s,u}$ is not already in normal form, the binary point of $M_{s,u}$ is shifted to the left or right by the number of placed indicated by the LSD Pointer (238). Module 234 then sends resulting normalized mantissa sum $M_s$ (254) to Select $M_s$ or Exception Value module 256.

Select $M_s$ or Exception Value module 256 receives normalized mantissa sum $M_s$ (254) from Normalize $M_{S,u}$ module 234, and the Overflow-Exception Signal (250 of FIG. 2) and the Underflow-Exception Signal (252 of FIG. 2) from Exponent Exceptions module 246. If the Overflow-Exception Signal (250 of FIG. 2) is 1, then module 256 will output the mantissa value assigned to overflow exceptions (e.g., 00000000) as the final value 258 for $M_s$. Likewise, if the Underflow-Exception Signal (252 of FIG. 2) is 1, then module 256 will output the mantissa value assigned to underflow exceptions (e.g., 00000000) as the final value 258 for $M_s$. If neither of those two exception signals is 1, then module 256 outputs normalized mantissa sum $M_s$ (254) received from module 234 as the final value 258 for $M_s$.

Floating-Point Addition Acceleration

In the prior-art one-step FLSD method illustrated in FIG. 2, mantissa addition (e.g., module 228 of FIG. 2) must be completed before any normalization adjustment of $E_{largest}$ (208) (e.g., modules 240 and 210 of FIG. 2) can begin. Further, the operations of encoding (e.g., module 240 of FIG. 2) the LSD Pointer (238) into the Exponent Shift Value (242), and then adding (e.g., module 210 of FIG. 2) the Exponent Shift Value (242) to $E_{largest}$ (208) to yield $E_s$ (244), take significant amounts of time.

In a floating-point system with $N_m$ mantissa bits and $N_e$ applicable exceptions, an addition of two numbers can result in only $(N_m+1)+N_e$ possible values of $E_s$: $E_{largest}+1$, $E_{largest}$, $E_{largest}-1$, . . . $E_{largest}-(N_m-1)$, plus $N_e$ exceptions (e.g., underflow, overflow, zero). Thus, in the addition of two numbers in IEEE 754 32-bit single-precision format, there are only (24+1+3) or 28 possible values for $E_s$, a much smaller number than the roughly 256 possible exponent values.

Thus, it is possible to compute all possible values of $E_s$ in parallel with each other and independent of mantissa addition. Those computed values then become data inputs to a selection device, such as a multiplexor, tri-state driver, parallel switches, etc. Then, instead of encoding the LSD Pointer into the Exponent Shift Value and adding that value to $E_{largest}$, the LSD Pointer itself becomes a control input of the selection device. The operations of encoding and addition/subtraction are replaced with the less-time-consuming operations of multiplexing and selecting. As such, a 10-15% reduction in computation time over the prior-art method can be realized.

Figure 5:
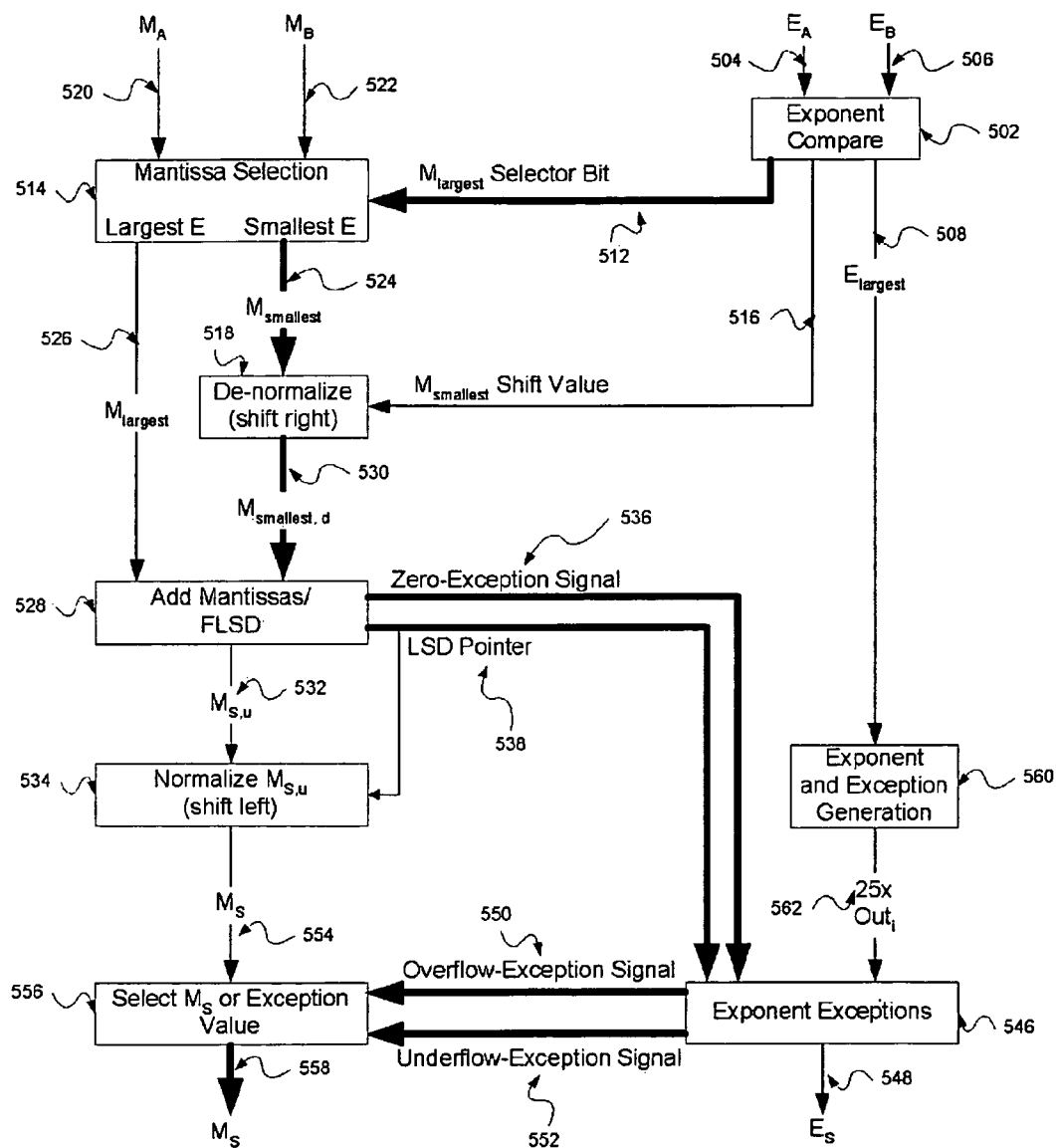
FIG. 5 is a block diagram of circuitry 500 designed to implement an FLSD method according to one embodiment of the present invention.

FIG. 5 is a block diagram of circuitry 500 designed to implement an FLSD method according to one embodiment of the present invention. Modules 502, 514, 518, 528, 534, and 556 are analogous to modules 202, 214, 218, 228, 234, and 256 of FIG. 2. Signals 520, 522, 526, 524, 530, 532, 554, 558, 504, 506, 512, 516, 518, 536, 538, 550, 552, and 548 are analogous to signals 220, 222, 226, 224, 230, 232, 254, 258, 204, 206, 212, 216, 208, 236, 238, 250, 252, and 248 of FIG. 2. Modules 240 and 210 of FIG. 2 have been removed and replaced with a new Exponent and Exception Lookup module 560. Modules 246 and 546 differ in several respects.

Add Mantissas/FLSD module 528 now sends the LSD Pointer (538) to Exponent Exceptions module 546. Exponent Compare module 502 now sends $E_{largest}$ (508) to new Exponent and Exception Lookup module 560. Exponent and Exception Lookup module 560 sends its output 562 to Exponent Exceptions module 546.

Figure 6:
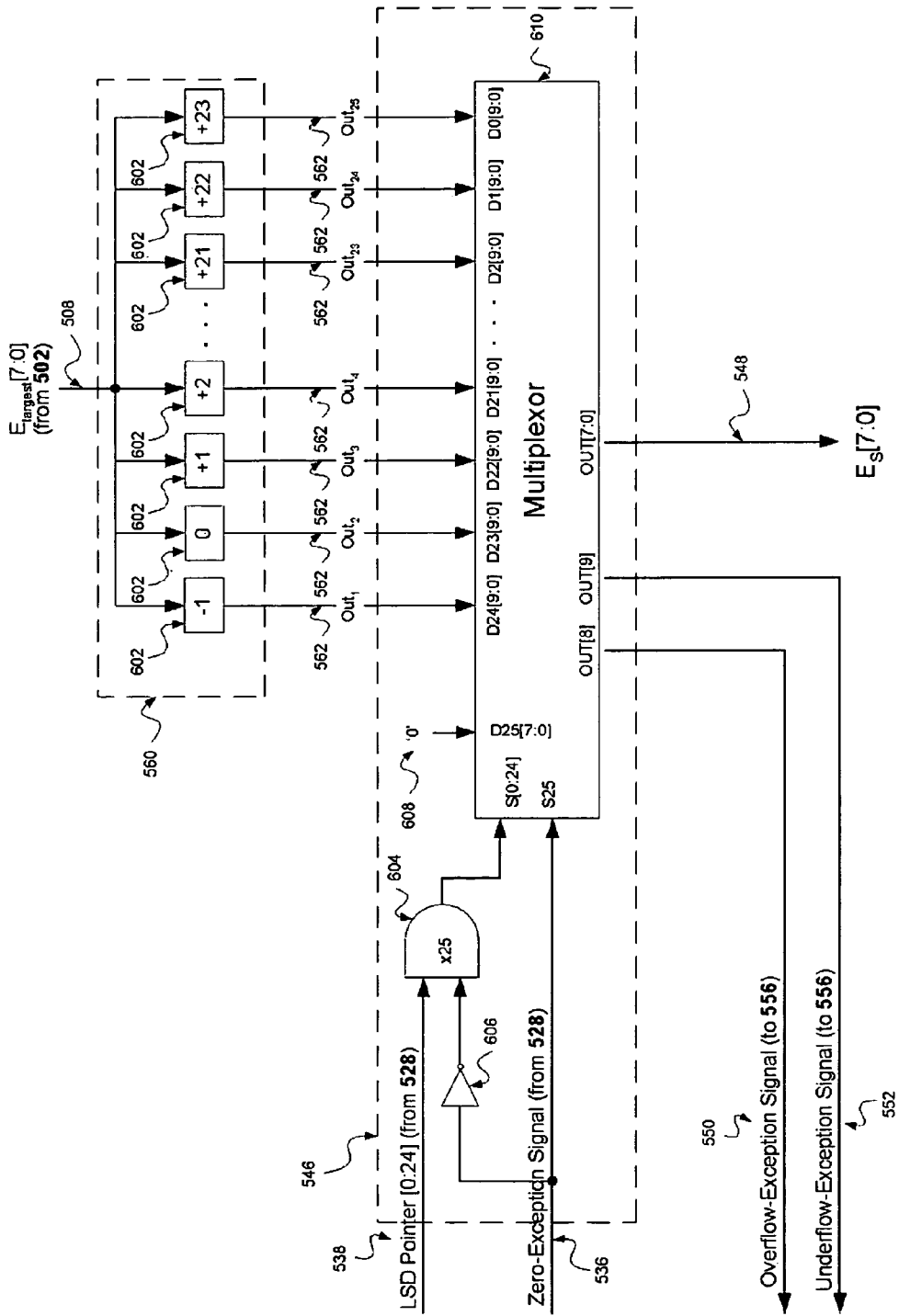
FIG. 6 is a block diagram of Exponent and Exception Lookup module 560 of FIG. 5

FIG. 6 is a block diagram of Exponent and Exception Lookup module 560 of FIG. 5 and Exponent Exceptions module 546 of FIG. 5. Modules 560 and 546 receive 1) $E_{largest}$ (508 of FIG. 5) from Exponent Compare module 502 of FIG. 2, 2) the LSD Pointer (538 of FIG. 5), and 3) the Zero-Exception Signal (536 of FIG. 5) from Add Mantissas/FLSD module 528 of FIG. 5. Modules 560 and 546 of FIG. 6 generate all $N_m+1$ possible values of exponent $E_s$ and then, based on the Zero-Exception Signal (536 of FIG. 5) and the LSD Pointer (538 of FIG. 5), output 1) the $E_s$ value (548 of FIG. 5) selected by the LSD Pointer (538 of FIG. 5), 2) the Overflow-Exception Signal (550 of FIG. 5), and 3) the Underflow-Exception Signal (552 of FIG. 5).

Exponent and Exception Lookup module 560 of FIG. 5 receives an 8-bit $E_{largest}$ (502 of FIG. 5) from Exponent Compare module 502 of FIG. 5, and sends that received $E_{largest}$ value to a number of Exponent Precomputation modules 602 simultaneously. The number of modules 602 will equal the number of mantissa digits of the numbering system, plus one (i.e., $N_m+1$). In FIG. 6, the numbering system is IEEE 754 single-precision format. Thus, the number of mantissa digits is 24, and therefore there are 24+1 or 25 modules 602. Associated with each 602 module is a constant ranging from –1 to +23.

Figure 7:
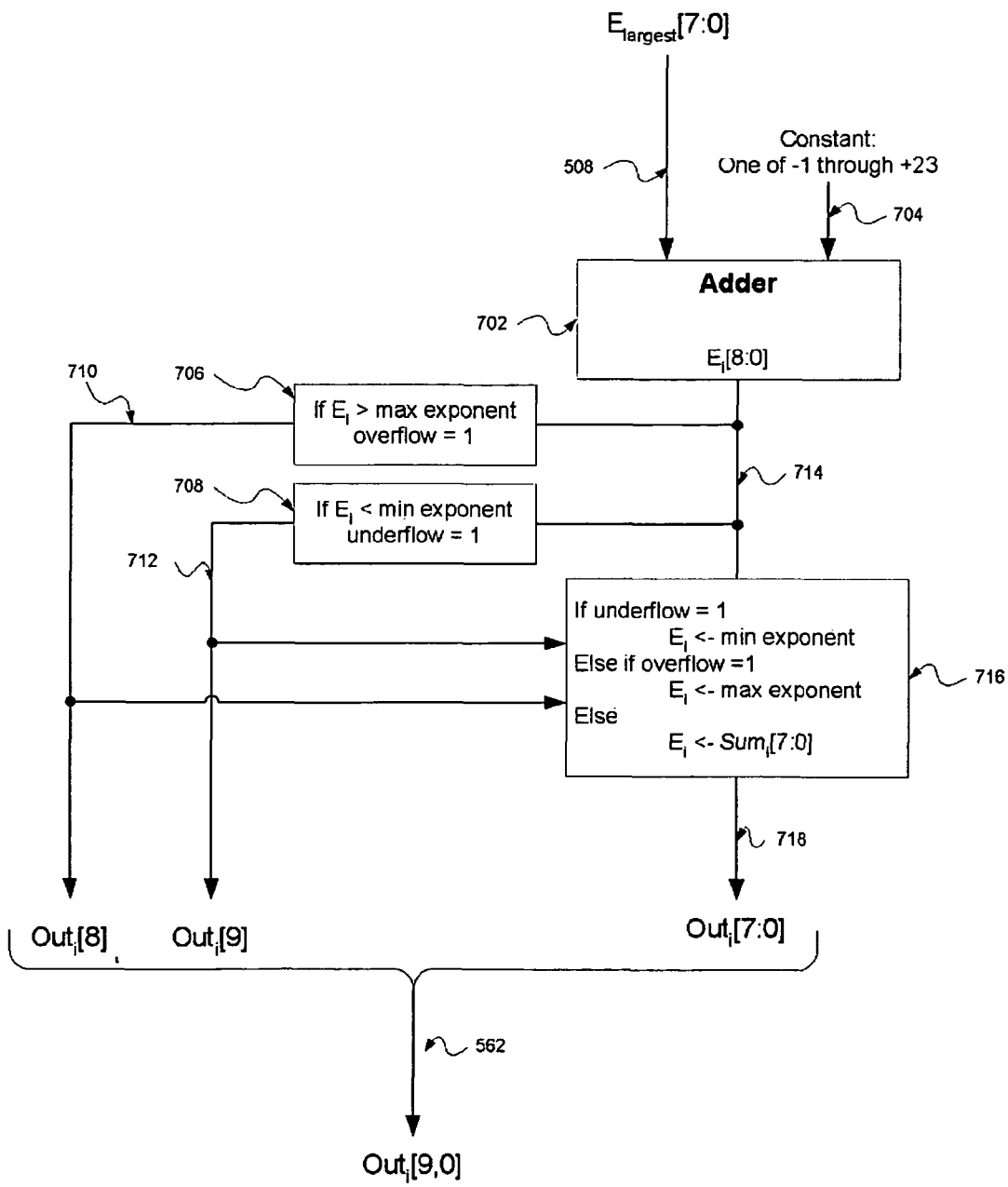
FIG. 7 is a block diagram of each Exponent Precomputation module 602 of FIG. 6.

FIG. 7 is a block diagram of each Exponent Precomputation module 602 of FIG. 6. Module 602 of FIG. 6 receives 8-bit input $E_{largest}$ (508 of FIG. 5), adds a constant value 704 to $E_{largest}$ (508 of FIG. 5), determines whether an underflow or overflow exception occurred as a result of that addition, and outputs a 10-bit $Out_i$ (562 of FIG. 5). The default value of bits 8 and 9 of $Out_i$ is 0 (i.e., the no overflow or underflow case).

Adder 702 adds its associated constant value 704 to $E_{largest}$ (508 of FIG. 5) to yield a 9-bit sum $E_i$ (714). The $9^{th}$ bit of $E_i$ (714) is to accommodate potential overflow/underflow situations. $E_i$ (714) is then sent to logic blocks 706, 708, and 716.

If an overflow exception has occurred, then logic block 706 sets bit 8 of $Out_i$ (562 of FIG. 5) to 1, and logic block 716 sets bits 0 through 7 of $Out_i$ (562 of FIG. 5) to a specified maximum exponent value. If an underflow exception has occurred, logic block 708 sets bit 9 of $Out_i$ (562 of FIG. 5) to 1, and logic block 716 sets bits 0 through 7 of $Out_i$ (562 of FIG. 5) to a specified minimum exponent value. If no exception has occurred, then bits 8 and 9 of $Out_i$ (562 of FIG. 5) remain 0, and logic block 716 sets bits 0 through 7 of $Out_i$ (562 of FIG. 5) equal to bits 0 through 7 of $E_i$ (714).

Returning to FIG. F, module 560 of FIG. 5 sends 25 10-bit $Out_i$ (562 of FIG. 5) values to data (bus) inputs D0 through D24 of multiplexor 610 in Exponent Exceptions module 546 of FIG. 5. Module 546 of FIG. 5 also receives the LSD Pointer (538 of FIG. 5) and the Zero-Exception Signal (536 of FIG. 5) from Add Mantissa/FLSD module 528 of FIG. 5.

If the mantissa addition performed in module 528 of FIG. 5 results in a 0, then the Zero-Exception Signal (536 of FIG. 5) will be a 1; otherwise, it is a 0. The Zero-Exception Signal (536 of FIG. 5) is sent to select input S25 on multiplexor 610, and also to inverter 606, the output of which is sent to an input of each of 25 AND gates 604. The other input to each of 25 AND gates 604 is one of the 25 bits of the LSD Pointer (538 of FIG. 5). The 25 outputs of AND gates 604 are sent to select inputs S0 through S24 on multiplexor 610.

If the Zero-Exception Signal (536 of FIG. 5) is 1 (i.e., mantissa addition resulted in 0), then the LSD Pointer (538 of FIG. 5) will be overwritten with a string of zeroes by AND gates 604, and thus none of the values D0 through D24 on multiplexor 610 will be selected. Instead, a value of 1 at select input S25 will cause multiplexor 610 to select the Zero-Exception Value 608 at data input D25, i.e., an 8-bit string of all 0s.

If, instead, the Zero-Exception Signal (536 of FIG. 5) is 0 (i.e., mantissa addition resulted in some number other than 0), then inverter 606 and AND gates 604 cause the LSD Pointer (538 of FIG. 5) to pass through to select inputs S0 through S24, selecting one of 25 $Out_i$ values (562 of FIG. 5). Bits 0 through 7 of the selected $Out_i$ are outputted as normalized exponent $E_s$ (548 of FIG. 5). Bit 8 of the selected $Out_i$ is outputted as the Overflow-Exception Signal (550 of FIG. 5), and bit 9 of the selected $Out_i$ is outputted as the Underflow-Exception Signal (552 of FIG. 5).

Although the present invention has been described in the context of the addition of two addends, other embodiments of the present invention can add different numbers N of addends. In such embodiments, all N addends are compared to determine $E_{largest}$. Then, N–1 addends (all but the one with the largest exponent) are de-normalized. Then, multiple addends are added/subtracted to yield two addends. For example, multiple mantissas can be added using a carry save adder tree to reduce N addends to two values, analogous to the tree-reduction operations used in parallel multipliers. Then the two addends are processed via the method discussed above. In theory, this can be done with nearly the same speed as a single pair of operands with only some time for the tree reduction added to the critical timing path One step in the addition of two floating-point addends is to de-normalize (if necessary) one or more of the addends such that their exponents match. The embodiment of the present invention presented above and in the attached figures accomplishes this step by de-normalizing the addend with the smallest exponent until the exponents match, i.e., by increasing $E_{smallest}$ by x so that $E_{smallest}$ is equal to $E_{largest}$ and shifting the binary point of $M_{smallest}$ x places to the left. However, the present invention is not so limited to that one method. Alternative methods include 1) de-normalizing the addend with the largest exponent until the exponents match, and 2) adjusting both addends until their exponents match a third, common value.

Furthermore, any use of the word "addition" regarding operands should be understood to represent both the operations of addition and subtraction.

Furthermore, although module 560 of FIG. 5 uses $N_m+1$ adders to compute the $N_m+1$ possible values of $E_s$, another method would be to use an $(N_m+1)$-deep lookup table.

In FIG. 5, modules 502, 514, 518, 528, 534, and 556 may be said to be implemented by a mantissa generator, module 560 may be said to be implemented by an exponent and exception generator, and module 546 may be said to be implemented by an exponent selector. Within the mantissa generator, modules 502, 514, 518, and 528 may be said to be implemented by an unnormalized mantissa sum generator, and modules 534 and 556 may be said to be implemented by a normalized mantissa generator. Within the unnormalized mantissa sum generator, modules 502, 514, and 518 may be said to be implemented by a de-normalizer, and module 528 may be said to implement a mantissa adder, an LSD pointer generator, and a zero-exception generator.

While the exemplary embodiments of the present invention specify a multiplexor as the selection device for selecting the proper value of $E_s$, any one of a number of alternate devices could have been specified, e.g., tri-state drivers, parallel switches, etc.

While the techniques described presume internal use of signed mantissas in 2's complement format, there exist other ways of processing a signed mantissa. For example, one could employ a sign magnitude adder/subtractor, or represent the sign magnitude mantissas in 1's complement format. Another method would be to use sequential logic to compute N+1 values, which may be useful in a heavily pipelined processor.

While the exemplary embodiments of the present invention have been described with respect to IEEE 754 32-bit floating-point numbering format, other embodiments of the present invention can accommodate other floating-point formats. For example, IEEE 754 64-bit double-precision format has an 11-bit exponent field and a 52-bit fraction field. To accommodate IEEE 754 64-bit double-precision format, an embodiment of the present invention would possess 54 adders 602 in FIG. 6, 54 AND gates 604 in FIG. 6, and a multiplexor 610 possessing 55 data inputs and 55 select inputs.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A machine-implemented method for generating a normalized floating-point sum from at least first and second floating-point addends, wherein each addend comprises a mantissa and an exponent, and the normalized floating-point sum comprises a mantissa and an exponent, the method comprising:
   (a) a mantissa generator generating the mantissa of the normalized floating-point sum based on the first and second floating-point addends;
   (b) an exponent generator generating a plurality of possible values for the exponent of the normalized floating-point sum based on a common exponent value; and
   (c) an exponent selector selecting one of the possible values to generate the exponent of the normalized floating-point sum, wherein:
      step (a) comprises:
         (a1) generating an unnormalized mantissa sum based on the first and second floating-point addends;
         (a2) generating a left-most significant digit (LSD) pointer indicating location of the LSD within the unnormalized mantissa sum;
         (a3) normalizing the unnormalized mantissa sum based on the LSD pointer to generate the mantissa of the normalized floating-point sum; and
      step (c) comprises selecting the exponent of the normalized floating-point sum based on the LSD pointer.

2. The invention of claim 1, wherein the plurality of possible values for the exponent of the normalized floating-point sum are generated independent of the generation of the mantissa of the normalized floating-point sum.

3. The invention of claim 1, wherein the plurality of possible values for the exponent of the normalized floating-point sum are generated in parallel with each other.

4. The invention of claim 1, wherein:
   the plurality of possible values for the exponent of the normalized floating-point sum are applied to data inputs of a selection device; and
   the LSD pointer is applied to select inputs of the selection device to select the exponent of the normalized floating-point sum.

5. The invention of claim 1, wherein:
   step (a) further comprises determining whether a zero-exception condition exists corresponding to the unnormalized mantissa sum being equal to zero; and
   step (b) further comprises:
      (b1) determining whether an overflow-exception condition exists corresponding to an exponent for the normalized floating-point sum that is greater than a specified maximum exponent value; and
      (b2) determining whether an underflow-exception condition exists corresponding to an exponent for the normalized floating-point sum that is smaller than a specified minimum exponent value.

6. The invention of claim 5, wherein, if one of the zero-exception condition, the overflow-exception condition, or the underflow-exception condition is determined to exist, then:
   step (a) comprises generating a corresponding special value for the mantissa of the normalized floating-point sum; and
   step (c) comprises generating a corresponding special value for the exponent of the normalized floating-point sum.

7. The invention of claim 1, wherein:
   step (a) comprises:
      (a1) de-normalizing, if the exponents of the first and second floating-point addends are different, one or more of the floating-point addends such that the exponents of the first and second floating-point addends are equal to a common exponent value;
      (a2) summing the mantissas of the first and second floating-point addends to generate an un-normalized mantissa;
      (a3) generating a left-most significant digit (LSD) pointer based on the un-normalized mantissa; and
      (a4) generating a zero-exception signal based on the un-normalized mantissa;
   step (b) comprises generating, based on the common exponent value, output values corresponding to all exponent values that can result from adding the at least first and second floating-point addends;
   step (c) comprises:
      (c1) applying a zero-exception value and the output values as data inputs for a selection device;
      (c2) generating, based on the LSD pointer and the zero-exception signal, select signals for the selection device;

(c3) outputting from the selection device, based on the select signals, one of the data inputs as a selected data output; and (c4) generating, from the selected data output, (i) the exponent value for the normalized floating-point sum, (ii) an overflow-exception signal, and (iii) an underflow-exception signal; and step (a) further comprises generating the mantissa for the normalized floating-point sum based on the unnormalized mantissa, the LSD pointer, the overflow-exception signal, and the underflow-exception signal.

8. The invention of claim 1, wherein generating a plurality of possible values for the exponent of the normalized floating-point sum comprises generating all of the non-exceptional values for the exponent of the normalized floating-point sum.

9. The invention of claim 1, wherein generating a plurality of possible values for the exponent of the normalized floating-point sum comprises generating all of the possible values for the exponent of the normalized floating-point sum.

10. An apparatus for generating a normalized floating-point sum from at least first and second floating-point addends, wherein each addend comprises a mantissa and an exponent, and the normalized floating-point sum comprises a mantissa and an exponent, the apparatus comprising:

a mantissa generator adapted to generate the mantissa of the normalized floating-point sum based on the first and second floating-point addends;

an exponent and exception generator adapted to generate a plurality of possible values for the exponent of the normalized floating-point sum based on a common exponent value; and an exponent selector adapted to select one of the possible values to generate the exponent of the normalized floating-point sum, wherein:

the mantissa generator comprises:

an unnormalized mantissa sum generator adapted to (i) generate an unnormalized mantissa sum based on the first and second floating-point addends and (ii) generate a left-most significant digit (LSD) pointer indicating location of the LSD within the unnormalized mantissa sum; and a normalized mantissa generator adapted to normalize the unnormalized mantissa sum based on the LSD pointer to generate the mantissa of the normalized floating-point sum; and the exponent selector is adapted to select the exponent of the normalized floating-point sum based on the LSD pointer.

11. The invention of claim 10, wherein the exponent and exception generator is adapted to generate the plurality of possible values for the exponent of the normalized floating-point sum in parallel with the generation of the mantissa of the normalized floating-point sum by the mantissa generator.

12. The invention of claim 10, wherein the exponent and exception generator is adapted to generate the plurality of possible values for the exponent of the normalized floating-point sum in parallel with each other.

13. The invention of claim 10, wherein:

the plurality of possible values for the exponent of the normalized floating-point sum are applied to data inputs of a selection device; and the LSD pointer is applied to select inputs of the selection device to select the exponent of the normalized floating-point sum.

14. The invention of claim 10, wherein:

the mantissa generator is further adapted to determine whether a zero-exception condition exists corresponding to the unnormalized mantissa sum being equal to zero; and the exponent and exception generator is further adapted to:

(1) determine whether an overflow-exception condition exists corresponding to an exponent for the normalized floating-point sum that is greater than a specified maximum exponent value; and (2) determine whether an underflow-exception condition exists corresponding to an exponent for the normalized floating-point sum that is smaller than a specified minimum exponent value.

15. The invention of claim 14, wherein:

the mantissa generator is adapted to generate a corresponding special value for the mantissa of the normalized floating-point sum, if one of the zero-exception condition, the overflow-exception condition, and the underflow-exception condition is determined to exist; and the exponent selector is adapted to generate a corresponding special value for the exponent of the normalized floating-point sum, if one of the zero-exception condition, the overflow-exception condition, and the underflow-exception condition is determined to exist.

16. The invention of claim 10, wherein:

the mantissa generator comprises:

a de-normalizer adapted to de-normalize one or more of the floating-point addends such that the exponents of the first and second floating-point addends are equal to a common exponent value, if the exponents of the first and second floating-point addends are different;

a mantissa adder adapted to sum the mantissas of the first and second floating-point addends to generate an unnormalized mantissa;

an LSD pointer generator adapted to generate a left-most significant digit (LSD) pointer based on the un-normalized mantissa; and a zero-exception generator adapted to generate a zero-exception signal based on the un-normalized mantissa;

the exponent and exception generator is adapted to generate, based on the common exponent value, output values corresponding to all exponent values that can result from adding the at least first and second floating-point addends;

the exponent selector is adapted to:

(1) apply a zero-exception value and the output values as data inputs for a selection device;

(2) generate, based on the LSD pointer and the zero-exception signal, select signals for the selection device;

(3) output from the multiplexer, based on the select signals, one of the data inputs as a selected data output; and (4) generate, from the selected data output, (i) the exponent value for the normalized floating-point sum, (ii) an overflow-exception signal, and (iii) an underflow-exception signal; and the mantissa generator is further adapted to generate the mantissa for the normalized floating-point sum based on the unnormalized mantissa, the LSD pointer, the overflow-exception signal, and the underflow-exception signal.

17. The invention of claim 10, wherein the exponent and exception generator is adapted to generate all of the non-exceptional values for the exponent of the normalized floating-point sum.

18. The invention of claim 10, wherein the exponent and exception generator is adapted to generate all of the possible values for the exponent of the normalized floating-point sum.

19. Apparatus for generating a normalized floating-point sum from at least first and second floating-point addends, wherein each addend comprises a mantissa and an exponent, and the normalized floating-point sum comprises a mantissa and an exponent, the apparatus comprising:
  (a) means for generating the mantissa of the normalized floating-point sum based on the first and second floating-point addends;
  (b) means for generating a plurality of possible values for the exponent of the normalized floating-point sum based on a common exponent value; and
  (c) means for selecting one of the possible values to generate the exponent of the normalized floating-point sum, wherein:
    the means for generating the mantissa comprises:
      (a1) means for generating an unnormalized mantissa sum based on the first and second floating-point addends;
      (a2) means for generating a left-most significant digit (LSD) pointer indicating location of the LSD within the unnormalized mantissa sum;
      (a3) means for normalizing the unnormalized mantissa sum based on the LSD pointer to generate the mantissa of the normalized floating-point sum; and
    the means for selecting one of the possible values to generate the exponent of the normalized floating-point sum comprises means for selecting the exponent of the normalized floating-point sum based on the LSD pointer.

20. Apparatus for generating a normalized floating-point sum from at least first and second floating-point addends, wherein each addend comprises a mantissa and an exponent, and the normalized floating-point sum comprises a mantissa and an exponent, the apparatus comprising:
  a mantissa generator adapted to generate the mantissa of the normalized floating-point sum based on the first and second floating-point addends;
  an exponent and exception generator adapted to generate a plurality of possible values for the exponent of the normalized floating-point sum based on a common exponent value; and
  an exponent selector adapted to select one of the possible values to generate the exponent of the normalized floating-point sum, wherein:
    the mantissa generator comprises:
      an unnormalized mantissa sum generator adapted to (i) generate an unnormalized mantissa sum based on the first and second floating-point addends and (ii) generate a left-most significant digit (LSD) pointer indicating location of the LSD within the unnormalized mantissa sum; and
      a normalized mantissa generator adapted to normalize the unnormalized mantissa sum based on the LSD pointer to generate the mantissa of the normalized floating-point sum;
    the plurality of possible values for the exponent of the normalized floating-point sum are applied to data inputs of a selection device; and
    the LSD pointer is applied to select inputs of the selection device to select the exponent of the normalized floating-point sum.

21. Apparatus for generating a normalized floating-point sum from at least first and second floating-point addends, wherein each addend comprises a mantissa and an exponent, and the normalized floating-point sum comprises a mantissa and an exponent, the apparatus comprising:
  a mantissa generator adapted to generate the mantissa of the normalized floating-point sum based on the first and second floating-point addends;
  an exponent and exception generator adapted to generate a plurality of possible values for the exponent of the normalized floating-point sum based on a common exponent value; and
  an exponent selector adapted to select one of the possible values to generate the exponent of the normalized floating-point sum, wherein:
    the mantissa generator comprises:
      a de-normalizer adapted to de-normalize one or more of the floating-point addends such that the exponents of the first and second floating-point addends are equal to a common exponent value, if the exponents of the first and second floating-point addends are different;
      a mantissa adder adapted to sum the mantissas of the first and second floating-point addends to generate an un-normalized mantissa;
      an LSD pointer generator adapted to generate a left-most significant digit (LSD) pointer based on the un-normalized mantissa; and
      a zero-exception generator adapted to generate a zero-exception signal based on the un-normalized mantissa;
    the exponent and exception generator is adapted to generate, based on the common exponent value, output values corresponding to all exponent values that can result from adding the at least first and second floating-point addends;
    the exponent selector is adapted to:
      (1) apply a zero-exception value and the output values as data inputs for a selection device;
      (2) generate, based on the LSD pointer and the zero-exception signal, select signals for the selection device;
      (3) output from the multiplexer, based on the select signals, one of the data inputs as a selected data output; and
      (4) generate, from the selected data output, (i) the exponent value for the normalized floating-point sum, (ii) an overflow-exception signal, and (iii) an underflow-exception signal; and
    the mantissa generator is further adapted to generate the mantissa for the normalized floating-point sum based on the unnormalized mantissa, the LSD pointer, the overflow-exception signal, and the underflow-exception signal.

22. A machine-implemented method for generating a normalized floating-point sum from at least first and second floating-point addends, wherein each addend comprises a mantissa and an exponent, and the normalized floating-point sum comprises a mantissa and an exponent, the method comprising:
  (a) generating the mantissa of the normalized floating-point sum based on the first and second floating-point addends;

(b) generating a plurality of possible values for the exponent of the normalized floating-point sum based on a common exponent value; and
(c) selecting one of the possible values to generate the exponent of the normalized floating-point sum, wherein:
   step (a) comprises:
      (a1) de-normalizing, if the exponents of the first and second floating-point addends are different, one or more of the floating-point addends such that the exponents of the first and second floating-point addends are equal to a common exponent value;
      (a2) summing the mantissas of the first and second floating-point addends to generate an un-normalized mantissa;
      (a3) generating a left-most significant digit (LSD) pointer based on the un-normalized mantissa; and
      (a4) generating a zero-exception signal based on the un-normalized mantissa;
   step (b) comprises generating, based on the common exponent value, output values corresponding to all exponent values that can result from adding the at least first and second floating-point addends;
   step (c) comprises:
      (c1) applying a zero-exception value and the output values as data inputs for a selection device;
      (c2) generating, based on the LSD pointer and the zero-exception signal, select signals for the selection device;
      (c3) outputting from the selection device, based on the select signals, one of the data inputs as a selected data output; and
      (c4) generating, from the selected data output, (i) the exponent value for the normalized floating-point sum, (ii) an overflow-exception signal, and (iii) an underflow-exception signal; and
   step (a) further comprises generating the mantissa for the normalized floating-point sum based on the unnormalized mantissa, the LSD pointer, the overflow-exception signal, and the underflow-exception signal.

* * * * *